United States Patent
Huang

(10) Patent No.: US 8,839,813 B2
(45) Date of Patent: *Sep. 23, 2014

(54) FAUCET HANDLE AND CONTROL MODULE

(75) Inventor: Li-Chen Huang, Changhua Hsien (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 589 days.

This patent is subject to a terminal disclaimer.

(21) Appl. No.: 13/207,407

(22) Filed: Aug. 10, 2011

(65) Prior Publication Data

US 2013/0036857 A1    Feb. 14, 2013

(51) Int. Cl.
*F16K 31/60*    (2006.01)

(52) U.S. Cl.
CPC ...................................... *F16K 31/60* (2013.01)
USPC ...................................... 137/315.12; 74/548

(58) Field of Classification Search
USPC .......... 74/543, 548, 552; 137/315.12, 315.14, 137/315.15; 251/288, 291; 4/678
See application file for complete search history.

(56) References Cited

U.S. PATENT DOCUMENTS

| | | | | |
|---|---|---|---|---|
| 2,306,876 A | * | 12/1942 | Gits | 403/362 |
| 4,065,216 A | * | 12/1977 | Nelson | 403/4 |
| 4,134,420 A | * | 1/1979 | Okonowitz | 137/315.14 |
| 4,794,945 A | * | 1/1989 | Reback | 137/315.12 |
| 4,876,766 A | * | 10/1989 | Cohen | 16/426 |
| 5,093,959 A | * | 3/1992 | McTargett et al. | 16/441 |
| 8,672,294 B2 | * | 3/2014 | Huang | 251/291 |

* cited by examiner

*Primary Examiner* — Thomas Diaz

(74) *Attorney, Agent, or Firm* — Che-Yang Chen; Law Office of Michael Chen

(57) ABSTRACT

A faucet handle and control module includes: a control handle and three joints. Each joints is respectively disposed between the protruding portion of the control handle and the engaging member, each joint has an insertion aperture. each insertion aperture having a different cross-sectional shape, two insertion apertures of the two joints having an assembly aperture at one end, the assembly aperture engaging with the screwing member of the control handle, these two joints having a securing aperture connected to the insertion aperture, and the securing aperture engaging with a securing member.

6 Claims, 6 Drawing Sheets

FAUCET HANDLE AND CONTROL MODULE

BACKGROUND OF THE INVENTION

1. Field of the Invention

The present invention relates to a wall-mounted faucet control module, and more particularly to a wall-mounted faucet control module which has different elements that can be correspondingly alternated, such that the control handles can be installed with the various water valves, which can provide variety and convenience.

2. Description of the Related Art

Currently, people prefer faucets in various styles. Moreover, people like to do home improvement chores by themselves. However, each faucet has a control shaft having different cross-sectional shapes and dimensions, and so the consumer needs to select a matching faucet handle, which can be very inconvenient.

Therefore, it is desirable to provide a wall-mounted faucet control module to mitigate and/or obviate the aforementioned problems.

SUMMARY OF THE INVENTION

An objective of the present invention is to provide a wall-mounted faucet control module In order to achieve the above-mentioned objectives, a faucet handle and control module comprises: a control handle and three joints. The control handle has a containment space, and a through aperture is connected to the containment space. Furthermore, a U-shaped protruding portion is disposed at a closed end of the containment space around the through aperture, and an engaging member is disposed in the closed end of the containment space facing an opening of the protruding portion. Each joints is respectively disposed between the protruding portion of the control handle and the engaging member, each joint has an insertion aperture. Two insertion apertures of the joints have an assembly aperture at one end, the assembly aperture engages with the screwing member of the control handle. Moreover, the two joints have a securing aperture connected to the insertion aperture, and the securing aperture engages with a securing member.

With the above-mentioned structure, the following benefits can be obtained: since, the joints of the control handle can be correspondingly alternated for the various water valves, the faucet control module can be installed with the various water valves, which can provide variety and convenience.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
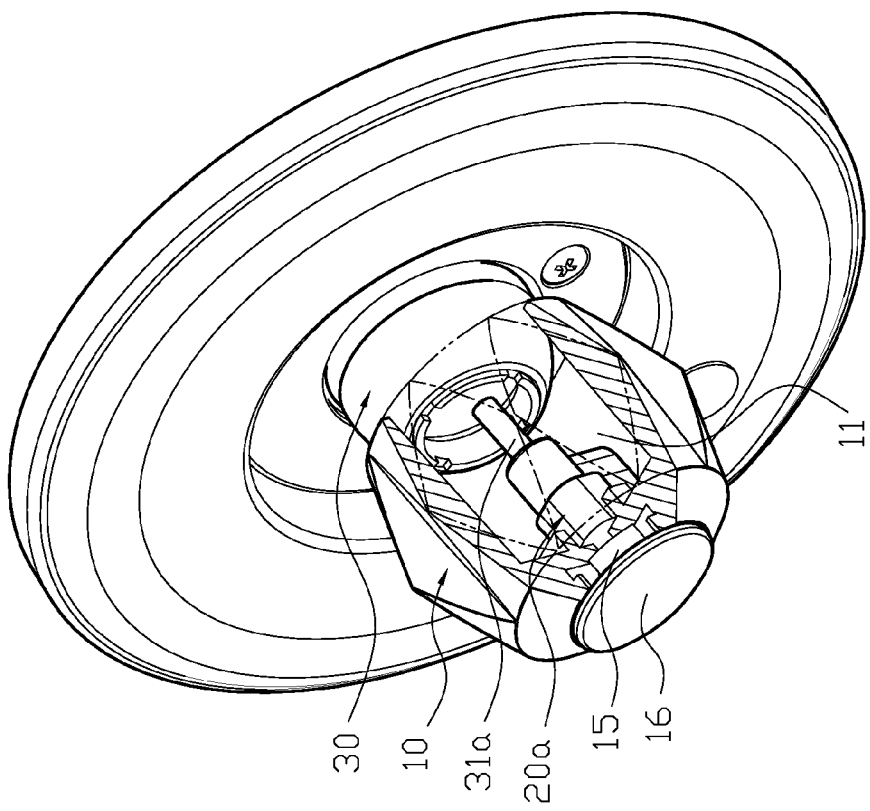
FIG. 1 is a perspective view of an embodiment of the present invention.
Figure 2:
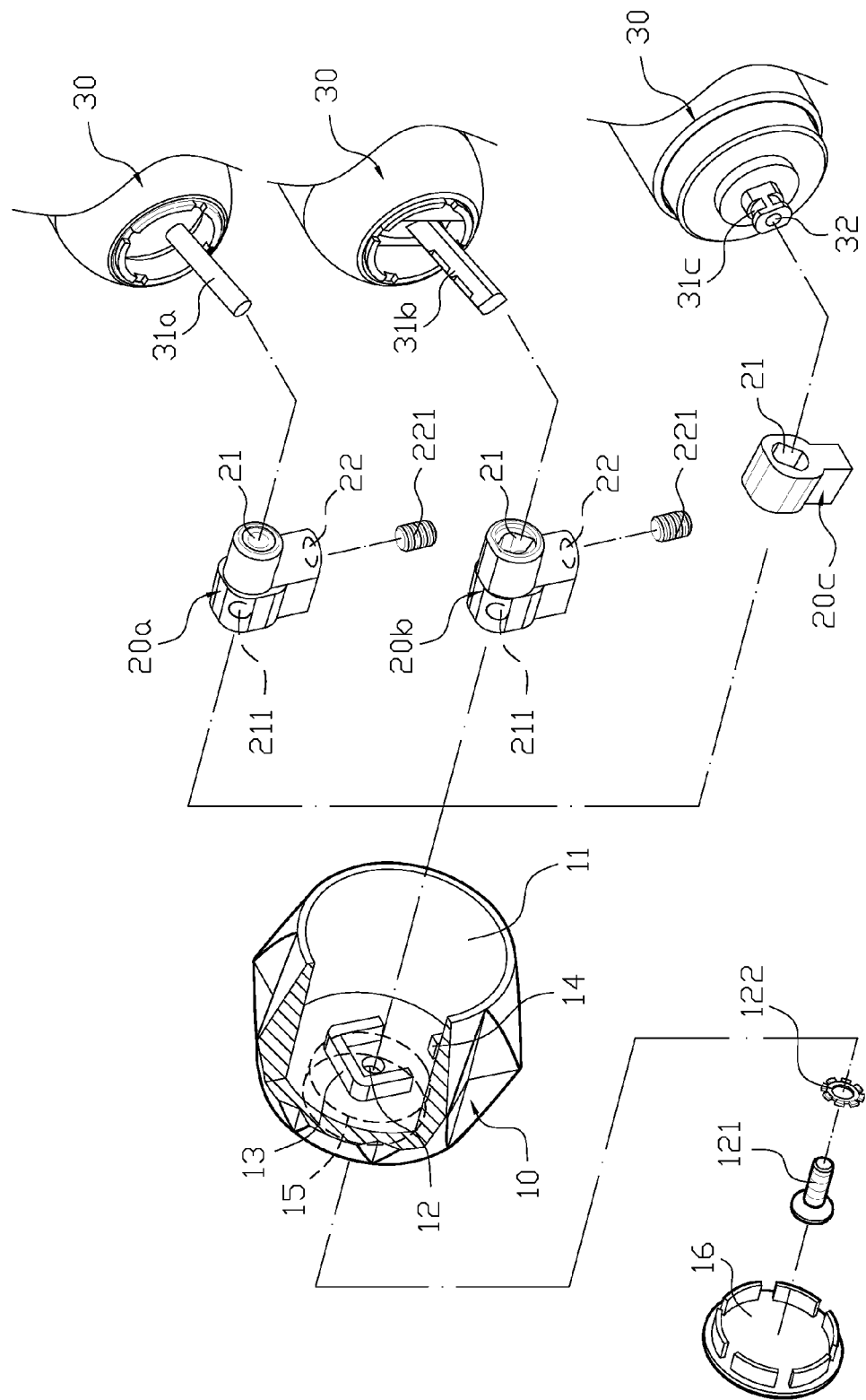
FIG. 2 is an exploded view of an embodiment of the present invention.

Please refer to FIG. 1 and FIG. 2. A wall-mounted faucet control module comprises: a control handle 10 and three joints 20a, 20b, 20c. The control handle 10 has a containment space 11, and a through aperture 12 is connected to the containment space 11. A locking member 121 and a washer 122 are provided adjacent to the through aperture 12. Furthermore, a U-shaped protruding portion 13 is disposed at a closed end of the containment space 11 around the through aperture 12, and an engaging member 14 is disposed in the closed end of the containment space 11 facing an opening of the protruding portion 13. The control handle 10 further has an indentation space 15 connected to the through aperture 12 on another side, and the indentation space 15 is provided with an ornamental cover 16. Each joints 20a, 20b, 20c is respectively disposed between the protruding portion 13 of the control handle 10 and the engaging member 14, each joint 20a, 20b, 20c has an insertion aperture 21. The insertion aperture of the joint 20a has a circular cross-sectional shape; the insertion aperture 21 of the joint 20b has a rhomboidal cross-sectional shape, and the insertion aperture of the joint 20c has an elliptical cross-sectional shape. Two insertion apertures 21 of the joints 20a, 20b have an assembly aperture 211 at one end, the assembly aperture 211 engages with the screwing member 121 of the control handle 10. Moreover, the two joints 20a, 20b have a securing aperture 22 connected to the insertion aperture 21, and the securing aperture 22 engages with a securing member 221.

For actual use, please refer to FIG. 2. The faucet control module can be mounted using various control rods 31a, 31b, 31c of the water valves 30. The control rod 31a has a circular cross-sectional shape, and the control rod 31b has a rhomboidal cross-sectional shape. The control rod 31c has an elliptical cross-sectional shape and an installation aperture 32 at a free end of control rod 31c.

Figure 3:
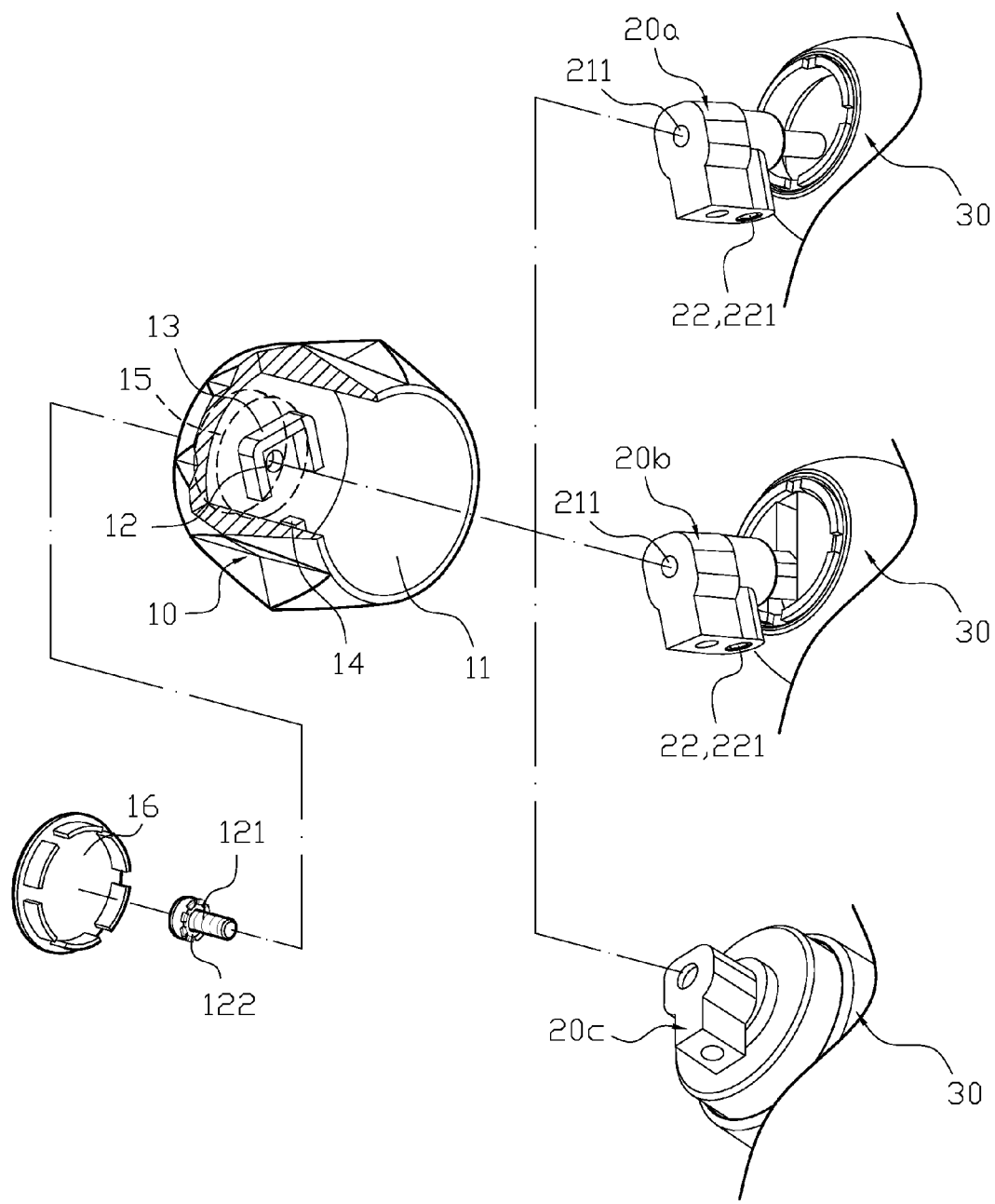
FIG. 3 illustrates assembly of an embodiment of the present invention.
Figure 4:
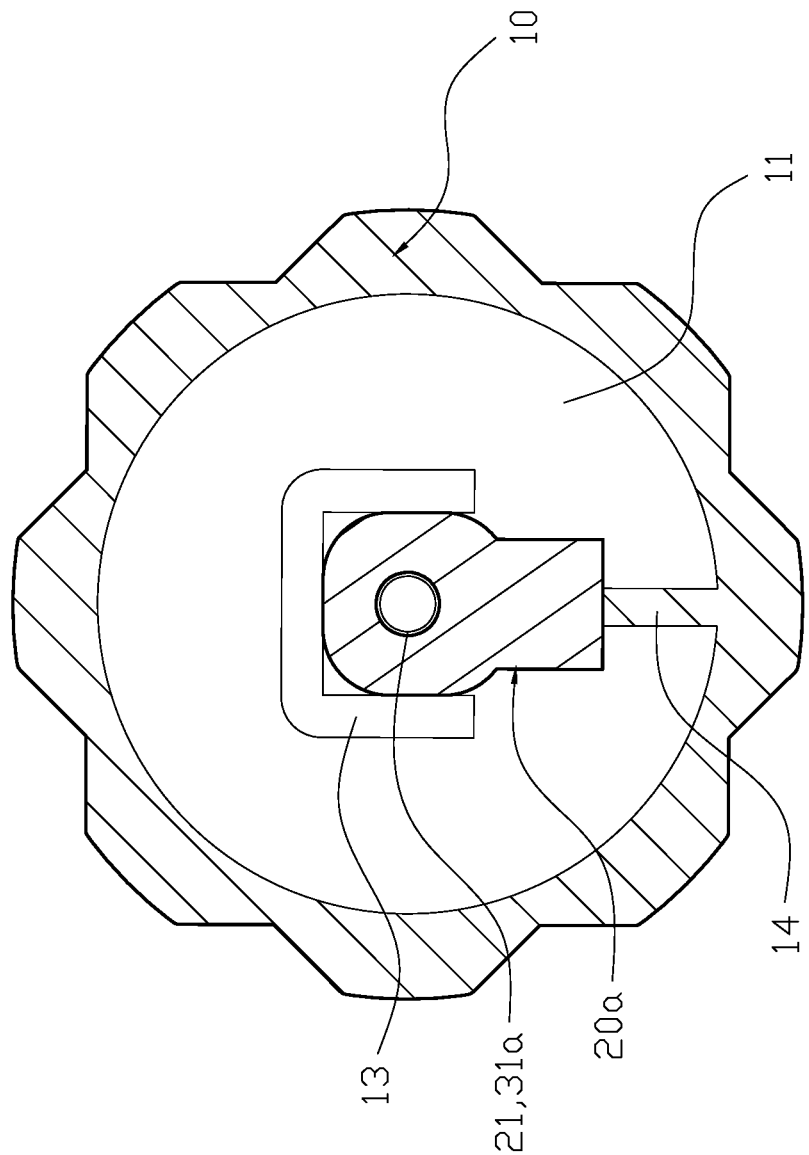
FIG. 4 is a cross-sectional view of a first combination of the present invention.
Figure 5:
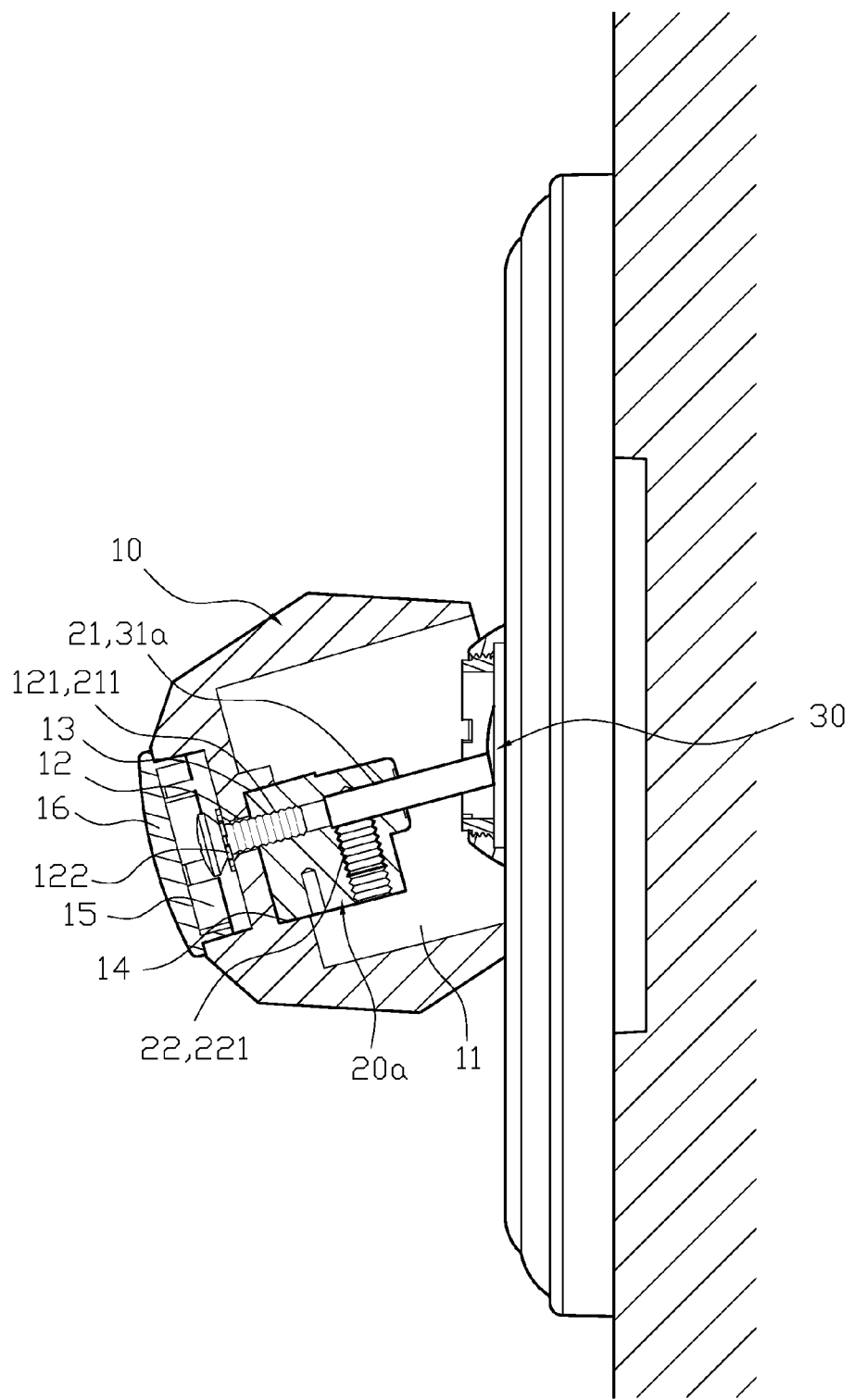
FIG. 5 is another cross-sectional view of the first combination of an embodiment of the present invention.

Please refer to FIG. 2 again. In order to install the faucet control module 10 onto the valve rod 31a or the valve rod 31b, first, the insertion aperture 21 of the joint 20a or the joint 20b is jacketed onto the control rods 31a, 31b. The securing member 221 is screwed onto the securing aperture 22 and tightens the control rods 31a, 31b (as shown in FIG. 3), and the containment space 11 of the control handle 10 is jacketed onto the joints 20a, 20b and disposed between protruding portion 13 and the engaging member 14 (as shown in FIG. 4). Furthermore, the insertion apertures 211 of the joints 20a, 20b are aligned with the through aperture 12 of the control handle 10. Afterward, the locking member 121 is placed through the washer 122 and the through aperture 12 and locked onto insertion apertures 211 of the joints 20a, 20b, and the indentation space 15 is placed to cover the ornamental cover 16, as shown in FIG. 5.

Figure 6:
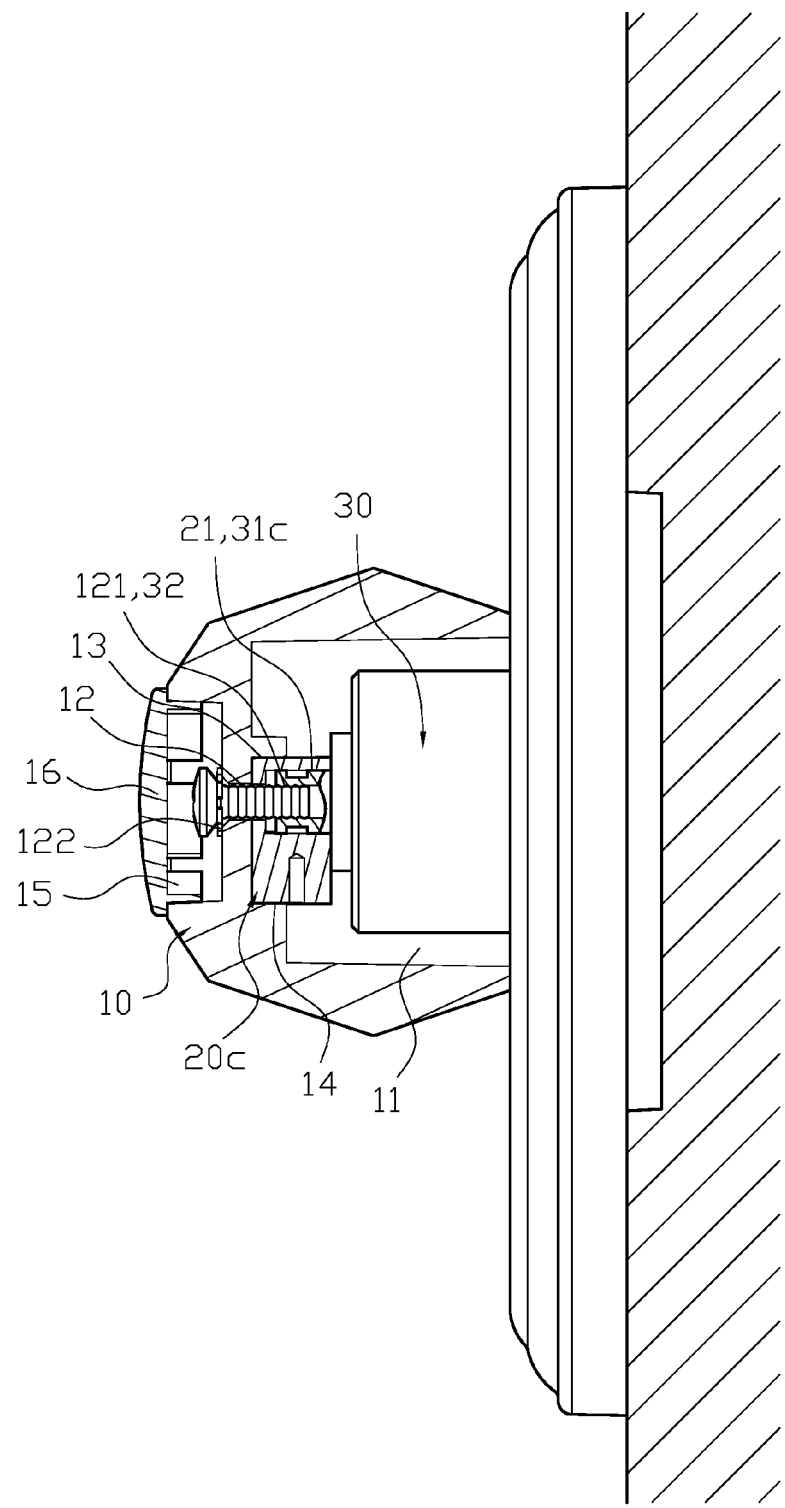
FIG. 6 is a cross-sectional view of a third combination of an embodiment of the present invention.

Please refer FIG. 2. In order to install the faucet control module 10 onto another the valve rod 31c, the insertion aperture 21 of the joint 20c is jacketed onto the control rods 31c, (as shown in FIG. 3), and the containment space 11 of the control handle 10 is jacketed onto the joint 20c and disposed between protruding portion 13 and the engaging member 14. Furthermore, the insertion aperture 21 of the joints 20c are aligned with the through aperture 12 of the control handle 10, the locking member 121 is placed through the washer 122 and the through aperture 12 and locked onto the installation aperture 32 of control rod 31c, and the indentation space 15 is placed to cover the ornamental cover 16 (as shown in FIG. 6). Since, the joints 20a, 20b, 20c, of the control handle 10 can be correspondingly alternated for the various types of valve rods 31a, 31b, 31c, the control handle 10 can be installed with the various water valves, which can provide variety and convenience.

With the above-mentioned structure, following benefits can be obtained: the joints 20a, 20b, 20c, of the control handle 10 can be correspondingly alternated for the various valve rods 31a, 31b, 31c, and the control handle 10 can be installed with the various water valves, which can provide variety and convenience.

Although the present invention has been explained in relation to its preferred embodiment, it is to be understood that many other possible modifications and variations can be made without departing from the spirit and scope of the invention as hereinafter claimed.

What is claimed is:

1. A faucet handle and control module configured for assembly with a recessed water valve comprising:
   a control handle having a containment space at a bottom face, a through aperture connected to the containment space, a locking member provided adjacent to the through aperture, a U-shaped protruding portion disposed at a closed end of the containment space around the through aperture, an engaging member disposed in the closed end of the containment space facing an opening of the protruding portion; and
   a plurality of joints, each joint disposed between the protruding portion of the control handle and the engaging member, each joint having an insertion aperture to accept the valve rod of the water valve, wherein each insertion aperture has a different cross-sectional shape, and the insertion aperture formed on two of said joints has an assembly aperture at one end, wherein the assembly aperture engages with the locking member of the control handle, and each of said two joints has a securing aperture connected to the corresponding insertion aperture, and the securing aperture engages with a securing member.

2. The faucet handle and control module as claimed in claim 1, wherein a washer is disposed between the locking member and the through aperture.

3. The faucet handle and control module as claimed in claim 1, wherein the control handle further has a indentation space connected to the through aperture on another side, and the indentation space is provided with an ornamental cover.

4. The faucet handle and control module as claimed in claim 1, wherein the insertion aperture of at least one of the joints has a circular cross-sectional shape.

5. The faucet handle and control module as claimed in claim 1, wherein the insertion aperture of at least one of the joints has a rhomboidal cross-sectional shape.

6. The faucet handle and control module as claimed in claim 1, wherein the insertion aperture of at least one of the joints has an elliptical cross-sectional shape.

* * * * *